US008755849B2

(12) United States Patent
Rofougaran et al.

(10) Patent No.: US 8,755,849 B2
(45) Date of Patent: Jun. 17, 2014

(54) METHOD AND SYSTEM FOR POWER MANAGEMENT IN A BEAMFORMING SYSTEM

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 678 days.

(21) Appl. No.: 12/116,296

(22) Filed: May 7, 2008

(65) Prior Publication Data

US 2009/0280750 A1    Nov. 12, 2009

(51) Int. Cl.
*H04B 7/06* (2006.01)

(52) U.S. Cl.
USPC ............... 455/574; 455/127.5; 455/101

(58) Field of Classification Search
CPC .. H04B 7/0877; H04B 7/0693; H04B 7/0814; H04W 52/0274; H04W 52/0277; H04W 52/028
USPC ................ 455/63.4, 67.11, 127.5, 574
See application file for complete search history.

(56) References Cited

U.S. PATENT DOCUMENTS

| | | | | |
|---|---|---|---|---|
| 5,983,086 | A * | 11/1999 | Tsukuda ..................... | 455/132 |
| 6,470,194 | B1 * | 10/2002 | Miya et al. ................. | 455/562.1 |
| 6,473,601 | B1 * | 10/2002 | Oda ............................ | 455/132 |
| 6,600,907 | B1 * | 7/2003 | Taguchi ...................... | 455/132 |
| 7,024,168 | B1 * | 4/2006 | Gustafsson et al. ........ | 455/135 |
| 7,555,063 | B2 * | 6/2009 | Sadahiro .................... | 455/561 |
| 2003/0153358 | A1 * | 8/2003 | Moon et al. ................ | 455/561 |
| 2004/0189519 | A1 * | 9/2004 | Kitakado .................... | 342/371 |
| 2004/0219959 | A1 * | 11/2004 | Khayrallah et al. ........ | 455/575.7 |
| 2004/0253955 | A1 * | 12/2004 | Love et al. .................. | 455/442 |
| 2005/0096058 | A1 * | 5/2005 | Warner et al. .............. | 455/446 |
| 2005/0136906 | A1 * | 6/2005 | Azuma ........................ | 455/418 |
| 2005/0197079 | A1 * | 9/2005 | Banister et al. ............ | 455/135 |
| 2005/0197080 | A1 * | 9/2005 | Ulupinar et al. ........... | 455/135 |
| 2005/0239424 | A1 * | 10/2005 | Kimata ....................... | 455/132 |
| 2005/0259627 | A1 * | 11/2005 | Song et al. ................. | 370/342 |
| 2006/0023669 | A1 * | 2/2006 | Yamaura et al. ........... | 370/335 |
| 2006/0068854 | A1 * | 3/2006 | Sandhu ....................... | 455/574 |
| 2006/0084461 | A1 * | 4/2006 | Sekiya et al. ............... | 455/522 |
| 2006/0135079 | A1 * | 6/2006 | Barnett et al. .............. | 455/69 |
| 2006/0222122 | A1 * | 10/2006 | Jung et al. .................. | 375/347 |
| 2007/0127609 | A1 * | 6/2007 | Kawada et al. ............. | 375/347 |
| 2007/0224951 | A1 * | 9/2007 | Gilb et al. ................... | 455/127.5 |
| 2007/0293176 | A1 * | 12/2007 | Yu et al. ..................... | 455/226.1 |
| 2008/0004078 | A1 * | 1/2008 | Barratt et al. .............. | 455/562.1 |

(Continued)

*Primary Examiner* — Gennadiy Tsvey
(74) *Attorney, Agent, or Firm* — Oblon, Spivak, McClelland, Maier & Neustadt, L.L.P.

(57) ABSTRACT

Aspects of a method and system for on-demand signal notching in a receiver. In this regard, power consumption in a wireless device may be managed by configuring one or more transmitters and/or receivers in the wireless device based on a directivity of a received signal and/or signal strength of a received signal. At least a portion of the transmitters and/or receivers may be disabled and/or enabled based on strength of undesired in-band components of the received signal, undesired out-of-band components of the received signal, signal to noise ratio of a desired component of the received signal, a user selected power mode, and/or a direction from said wireless device to a communication partner. A splitter and/or combiner of the wireless device may be configured based on which portion of the transmitters and/or receivers are enabled. A scaling factor and/or a phase shift of the splitter and/or combiner may be configured.

27 Claims, 5 Drawing Sheets

(56) References Cited

U.S. PATENT DOCUMENTS

| | | | |
|---|---|---|---|
| 2008/0025254 A1* | 1/2008 | Love et al. | 370/329 |
| 2008/0132265 A1* | 6/2008 | Tudosoiu | 455/522 |
| 2008/0151798 A1* | 6/2008 | Camp | 370/311 |
| 2008/0220819 A1* | 9/2008 | Ben-Eli | 455/561 |
| 2009/0011714 A1* | 1/2009 | Hozumi | 455/67.11 |
| 2009/0061939 A1* | 3/2009 | Andersson et al. | 455/562.1 |
| 2009/0063911 A1* | 3/2009 | Tsukio et al. | 714/708 |
| 2009/0097599 A1* | 4/2009 | Abdelgany et al. | 375/347 |
| 2009/0111406 A1* | 4/2009 | Posti et al. | 455/150.1 |
| 2009/0143039 A1* | 6/2009 | Ishikawa et al. | 455/273 |
| 2009/0156227 A1* | 6/2009 | Frerking et al. | 455/455 |
| 2009/0233571 A1* | 9/2009 | Okumura | 455/334 |
| 2010/0234060 A1* | 9/2010 | Beamish | 455/522 |

* cited by examiner

METHOD AND SYSTEM FOR POWER MANAGEMENT IN A BEAMFORMING SYSTEM

CROSS-REFERENCE TO RELATED APPLICATIONS/INCORPORATION BY REFERENCE

This patent application makes reference to
U.S. patent application Ser. No. 12/116,315 filed on May 8, 2008; and
U.S. patent application Ser. No. 11/955,027 filed on Dec. 12, 2007.

The above stated application is hereby incorporated herein by reference in its entirety.

FIELD OF THE INVENTION

Certain embodiments of the invention relate to signal processing. More specifically, certain embodiments of the invention relate to a method and system for power management in a beamforming system.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Additionally, as the number of wireless devices and wireless communications standards increase, commonly used frequency bands are becoming increasingly congested with wireless traffic. In this regard, designing devices that can reliably operate in such noisy frequency bands is becoming increasingly difficult and costly. Accordingly, efforts exist to develop wireless technologies which operate at higher, less congested frequencies.

For example, in 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence mechanisms. The communications taking place in this band are often referred to as '60 GHz communications'. With respect to the accessibility of this part of the spectrum, 60 GHz communications is similar to other forms of unlicensed spectrum use, for example Wireless LANs or Bluetooth in the 2.4 GHz ISM bands. However, communications at 60 GHz may be significantly different in aspects other than accessibility. In this regard, there may be certain drawbacks associated with 60 GHz communications. For example, 60 GHz signals may provide markedly different communications channel and propagation characteristics. In this regard, 60 GHz radiation is partly absorbed by oxygen in the air. Accordingly, 60 GHz communications suffer from increased attenuation with distance as compared to, for example, 2.4 GHz. On the other hand, there may be advantages associated with 60 GHz communications. For example, since a very large bandwidth of 7 GHz is available, very high data rates may be achieved.

Shrinking features size of CMOS processes, for example, is one factor enabling development products and technologies for 60 GHz communications. However, even when fabricated on the smallest processes, conventional methods and circuit topologies are often unable to realize signal generation circuits which can generate signals sufficiently high in frequency to enable technologies such as 60 GHz communications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for power management in a beamforming system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for power management in a beamforming system. In accordance with various embodiments of the invention, power consumption in a wireless device may be managed by configuring one or more transmitters and/or receivers in the wireless device based on a directivity of a received signal and/or signal strength of a received signal. At least a portion of the transmitters and/or receivers may be disabled and/or enabled based on strength of undesired in-band components of the received signal, undesired out-of-band components of the received signal, signal to noise ratio of a desired component of the received signal, a user selected power mode, and/or a direction from the wireless device to a communication partner. A splitter and/or combiner of the wireless device may be configured based on which portion of the transmitters and/or receivers are enabled. A scaling factor and/or a phase shift of the splitter and/or combiner may be configured.

Figure 1:
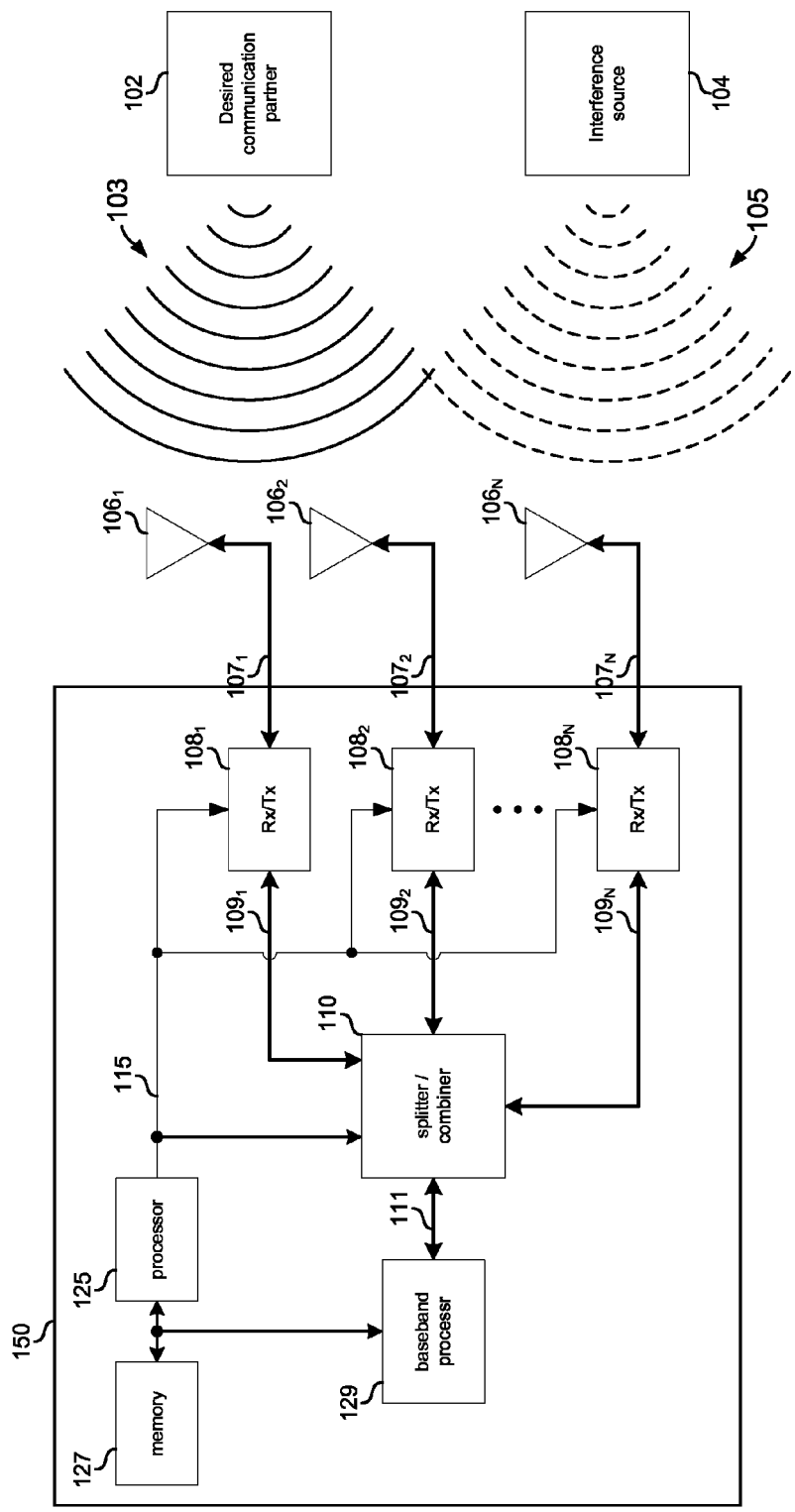
FIG. 1 is block diagram that illustrates exemplary power management in a beamforming system, in accordance with an embodiment of the invention.

FIG. 1 is block diagram illustrating power management in a beamforming system, in accordance with an embodiment of the invention. Referring to FIG. 1, there is shown a wireless device 150 that may comprise RF transmitters and/or receivers $108_1, \ldots, 108_N$, which may be collectively referred to herein as transmitters and/or receivers 108; a digital baseband processor 129; a processor 125; and a memory 127. The wireless device also may comprise or be communicatively coupled to antennas $106_1, \ldots, 106_N$, which may be collectively referred to herein as antennas 106. The wireless device 150 may be operable transmit and receive information utilizing a high data rate and line-of-site communications operating at extremely high frequency (EHF) such as the ISM band centered at 61.25 GHz.

The RF transmitters and/or receivers 108 may each comprise suitable logic, circuitry, and/or code that may enable processing of RF signals for transmission and/or reception. The RF transmitters and/or receivers 108 may each enable transmitting and/or receiving RF signals in a plurality of frequency bands. For example, the RF transmitters and/or receivers 108 may each enable transmitting and/or receiving signals in extremely high frequency (e.g., 60 GHz) bands. Accordingly, for reception, the RF transmitters and/or receivers 108 may each be enabled to receive, filter, amplify, down-convert, and/or perform analog to digital conversion. Similarly, for transmission, the RF transmitters and/or receivers 108 may each be enabled to perform digital-to-analog conversion, up-convert, filter, and/or amplify. In various embodiments of the invention, the wireless device 150 may support multiple frequency bands and/or simultaneous transmission and reception of signals in the same frequency band. In some embodiments of the invention the RF transmitters and/or receivers 108 may each perform direct conversion between baseband and RF and in other embodiments of the invention the RF transmitters and/or receivers 108 may each convert between baseband and/or RF signals and one or more intermediate frequencies (IF). Furthermore, the RF transmitters and/or receivers 108 may each perform quadrature down-conversion where in-phase components and quadrature-phase components may be processed in parallel.

The baseband processor 129 may comprise suitable logic, circuitry, and/or code that may enable processing and/or handling of baseband signals. In this regard, the baseband processor 129 may process or handle analog and/or digital signals received from and/or to be transferred to one or more of the RF transmitters and/or receivers 108. The baseband processor 129 may also provide control and/or feedback information to one or more of the RF transmitters and/or receivers 108, the processor 125, and/or to the memory 127 based on information from the processed signals. In various embodiments of the invention, the baseband processor 129 may measure and/or characterize received signal(s) in order to dynamically control which of the RF transmitters and/or receivers 108 may be utilized to receive and/or transmit signals. For example, the baseband processor 129 may perform FFT analysis of received signals in order to characterize an environment in which the wireless device 150 may be operating and/or to determine the strength of in-band and/or out-of-band signal components.

The processor 125 may comprise suitable logic, circuitry, and/or code that may enable control and/or data processing operations for the wireless device 150. The processor 125 may be utilized to control at least a portion of and/or exchanges between the RF transmitters and/or receivers 108, the digital baseband processor 129, and/or the memory 127. In this regard, the processor 125 may generate at least one signal for controlling operations within the wireless device 150. For example, the processor 125 may generate the signal(s) 115 which may enable and/or disable one or more of the transmitters and/or receivers 108 and/or configure the splitter and/or combiner 110. The processor 125 may also enable execution of applications that may be utilized by the wireless device 150. For example, the processor 125 may execute applications that may enable displaying and/or interacting with content received via EHF communications 150.

The memory 127 may comprise suitable logic, circuitry, and/or code that may enable storage of data and/or other information utilized by the wireless device 150. For example, the memory 127 may be utilized for storing processed data generated by the digital baseband processor 129 and/or the processor 125. The memory 127 may also be utilized to store information, such as configuration information, that may be utilized to control the operation of at least one block in the wireless device 150. For example, the memory 127 may comprise information necessary to configure which of the RF transmitters and/or receivers 108 may be utilized to receive and/or transmit signals and corresponding phase shift and/or scaling coefficients for the splitter and/or combiner 110.

The splitter and/or combiner 110 may comprise suitable logic, circuitry, and/or code that may enable splitting a signal 111 to be transmitted into one or more signals 109 and/or combining one or more received signals 109 into the signal 111. In this regard, the splitter and/or combiner 110 may be enabled to apply a phase shift and/or a scaling factor to one or more of the signals 109. The phase shift and/or scaling factor may enable controlling the directivity and/or strength of transmitted and/or received signals.

In an exemplary receive operation, it may be desirable for the wireless device 150 to receive the signal 103 transmitted by the partner 102 while ignoring and/or rejecting the signal 105 transmitted by the source 104. In this regard, the signals 103 and 105 may induce a voltage and/or current on the antennas 106 and generate the signals 107. Accordingly, the signals 107 may comprise components resulting from both the desired signal 103 and the undesired signal 105.

The signals 107 may be conveyed to the transmitters and/or receivers 108 but of the signals $107_1, \ldots, 107_N$ generated by the antennas 106, only those signals $107_1, \ldots, 107_M$ communicatively coupled to active transmitters and/or receivers $108_1, \ldots, 108_M$, may be processed to generate corresponding baseband signals $109_1, \ldots, 109_M$, where 'N', an integer greater than or equal to 1, may be the total number of transmitters and/or receivers and 'M', an integer greater than or equal to 1, may be the number of active (enabled) transmitters and/or receivers. In this regard, one or more of the transmitters and/or receivers 108 may be powered down (disabled) based on the control signal(s) 115.

Subsequent to generation of the baseband signals $109_1, \ldots, 109_M$ by the active transmitters and/or receivers $108_1, \ldots, 108_M$, the splitter and/or combiner 110 may combine the baseband signals $109_1, \ldots, 109_M$ to generate a baseband signal 111. In this regard, a phase shift and/or scaling factor may be applied to each signal $109_i$ and may be determined based on the control signal(s) 115. For example, a look-up table stored in the memory 127 may be utilized to determine scaling and/or phase shift coefficients associated with each of the active transmitters and/or receivers $108_i$.

Measurements and/or characterization of the signal 111 may then be performed by the baseband processor 129. For example, it may be determined whether strong in-band and/or out-of-band signal components may be present, and/or whether excessive noise may be present. A result of the signal measurements and/or characterization may then be communicated to the processor 125 and/or the memory 127. Accordingly, the processor 125 may generate the control signal(s) 115.

The control signal(s) 115 may enable and/or disable one or more of the transmitters and/or receivers 108 and configure phase and/or scaling coefficients of the splitter and/or combiner 110. In this regard, fewer active (enabled) transmitters and/or receivers 108 may reduce power consumption of the wireless device 150 at the expense of received signal strength and directivity of the antennas $106_1, \ldots, 106_M$. Conversely, an increased number of active (enabled) transmitters and/or receivers 108 may increase the directivity of the antennas $106_1, \ldots, 106_M$ and received signal strength, at the expense of increased power consumption. Thus, based on characterization of a signal and/or of a channel over which the wireless device 150 may communicate, the wireless device 150 may utilize dynamically configure the transmitters and/or receivers 108. For example, the desired signal 103 may be sufficiently strong and/or the undesired signal 105 (and/or any other interference and/or noise) may be sufficiently weak. Accordingly, a single antenna 106; and transceiver 108, may enable reliably receiving the signal 103. Conversely, the desired signal 103 may be weak and/or the undesired signal 105 (and/or any other interference and/or noise) may be strong. Accordingly, a plurality of transmitters and/or receivers 108, along with appropriate coefficients of the splitter and/or combiner 110, may be utilized to direct the overall radiation pattern of the antennas 106 toward the partner 102 and away from the source 104.

In an exemplary transmit operation, the wireless device 150 may utilize a transceiver and antenna configuration determined during reception. For example, when transmitting to the partner 102, the wireless device may utilize the transmitters and/or receivers and associated phase shift and scaling factors utilized for receiving signals from the partner 102.

In various embodiments of the invention, the transmitters and/or receivers 108 may also be configured based on a power mode and/or user setting. For example, the wireless device may have "power save", "auto", and "max range" modes. In "power save" mode, the wireless device 150 may be configured such that only one transceiver $108_i$ may be enabled at any given time. Furthermore, in "power save" mode, measurements and/or characterization of received signals may be utilized to, for example, select which one of the transmitters and/or receivers 108 should be enabled. In "max range" mode, the wireless device 150 may be configured such that all transmitters and/or receivers 108 may be enabled. Furthermore, in "max range" mode, measurements and/or characterization of received signals may be utilized to, for example, control phase shift and scaling applied by the splitter and/or combiner 110. In "auto" mode, the number of enabled transmitters and/or receivers 108 may be determined based on signal measurements and/or characterization performed by the baseband processor 129.

Figure 2A:
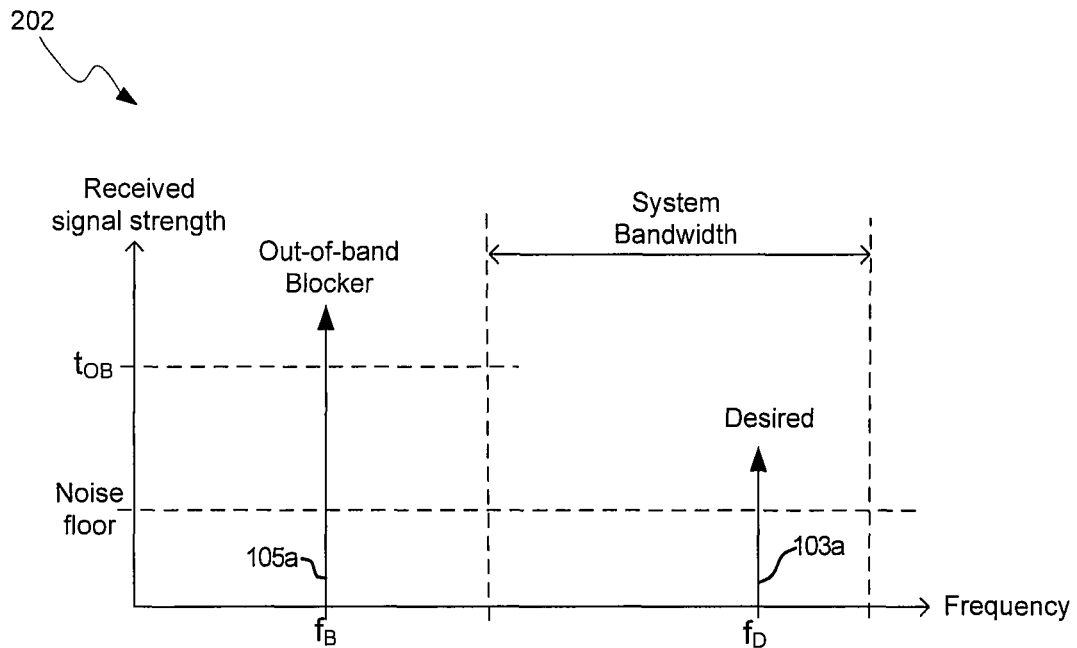
FIGS. 2A-2B are diagrams that illustrate exemplary power management in a beamforming system based on measured out-of-band signals, in accordance with an embodiment of the invention.
Figure 2B:
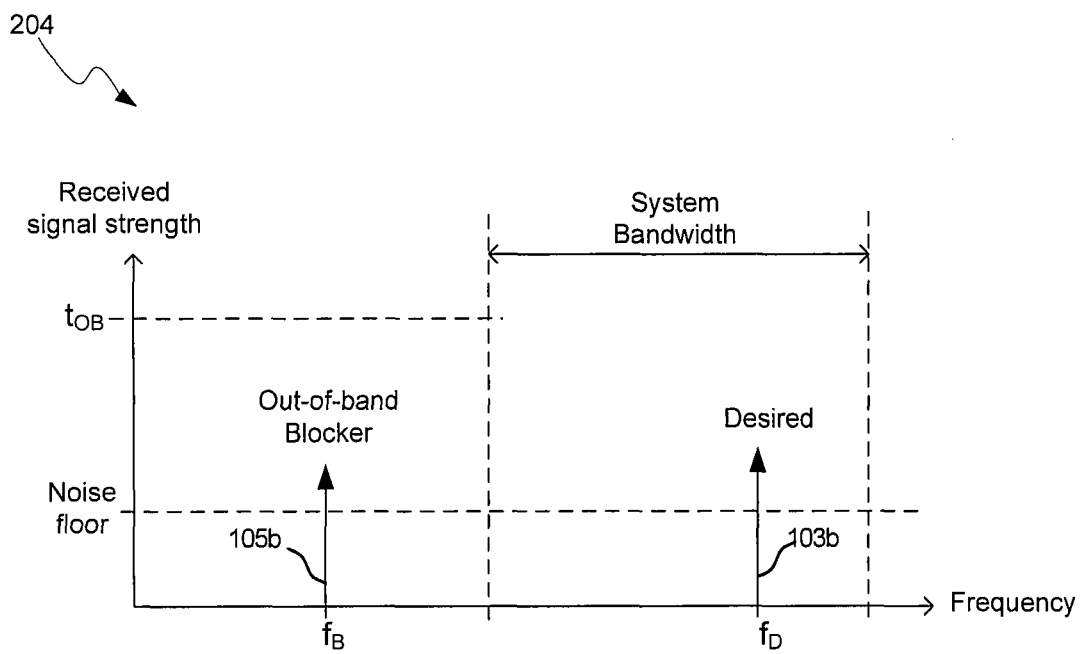

FIGS. 2A-2B are diagrams that illustrates exemplary power management in a beamforming system based on measured out-of-band signals, in accordance with an embodiment of the invention. Referring to FIGS. 2A and 2B there is shown two exemplary received signals 202 and 204 with desired components 103a and 103b, respectively, and undesired (interference) out-of-band components 105a and 105b, respectively. In this regard, the system bandwidth depicted in FIGS. 2A and 2B may be determined by one or more filters (not shown) in the wireless device 150 described with respect to FIG. 1. Also depicted in FIGS. 2A and 2B are an out-of-band noise threshold, $t_{OB}$, and a noise floor.

In FIG. 2A, the out-of-band interference may be greater than $t_{OB}$. In instances where the out of band interference may be greater than $t_{OB}$, beamforming may be utilized and a plurality of transmitters and/or receivers 108 may be enabled.

In FIG. 2B, the out-of-band interference may be less than $t_{OB}$. In instances where the out-of-band interference may be less than $t_{OB}$, beamforming may be unnecessary and, for example, only a single transceiver $108_i$ may be enabled.

Figure 2C:
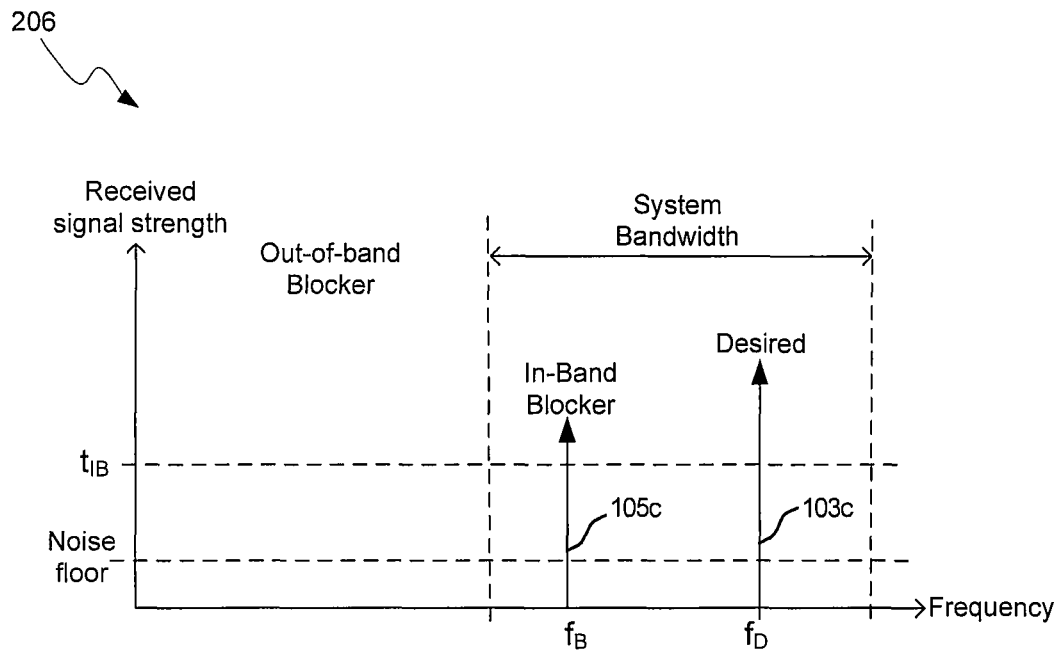
FIGS. 2C-2D are diagrams that illustrate exemplary power management in a beamforming system based on measured in-band signals, in accordance with an embodiment of the invention.
Figure 2D:
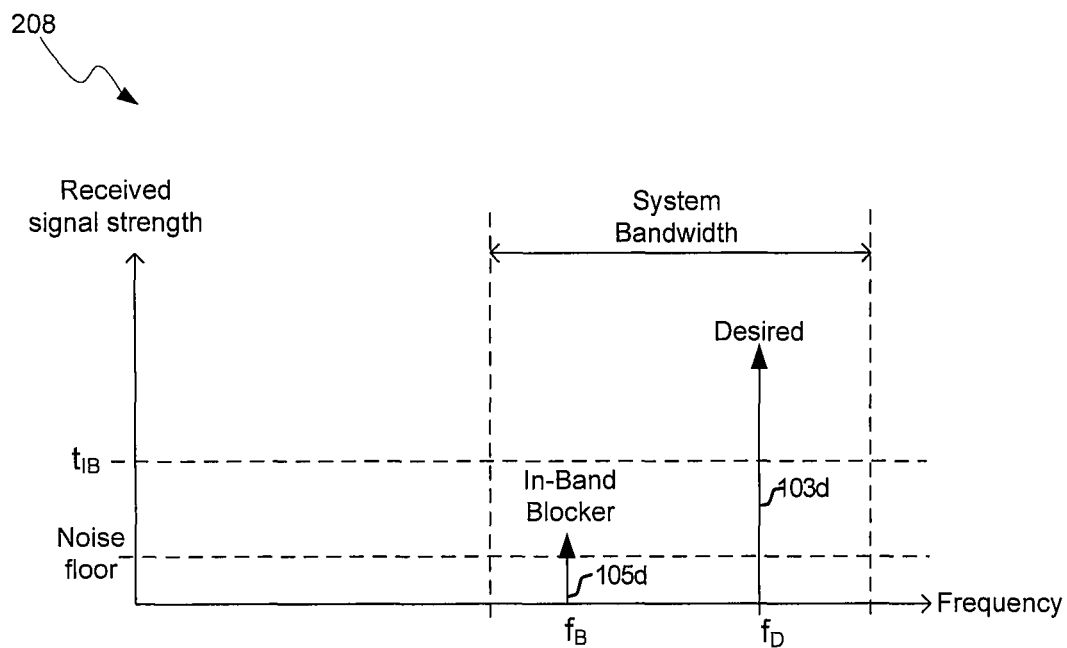

FIGS. 2C-2D are diagrams that illustrates exemplary power management in a beamforming system based on measured in-band interference, in accordance with an embodiment of the invention. Referring to FIGS. 2C and 2D there is shown two exemplary received signals 206 and 208 with desired components 103c and 103d, respectively, and undesired (interference) in-band components 105c and 105d, respectively. In this regard, the system bandwidth depicted in FIGS. 2C and 2D may be determined by one or more filters (not shown) in the wireless device 150 described with respect to FIG. 1. Also depicted in FIGS. 2C and 2D are an in-band noise threshold, $t_{IB}$, and a noise floor.

In FIG. 2C, in-band interference may be greater than $t_{IB}$. In instances that in-band interference may be greater than $t_{IB}$, beamforming may be utilized and a plurality of transmitters and/or receivers 108 may be enabled.

In FIG. 2D, in-band interference may be less than $t_{IB}$. In instances where in-band interference may be less than $t_{IB}$, beamforming may be unnecessary and, for example, only a single transceiver $108_i$ may be enabled.

Figure 2E:
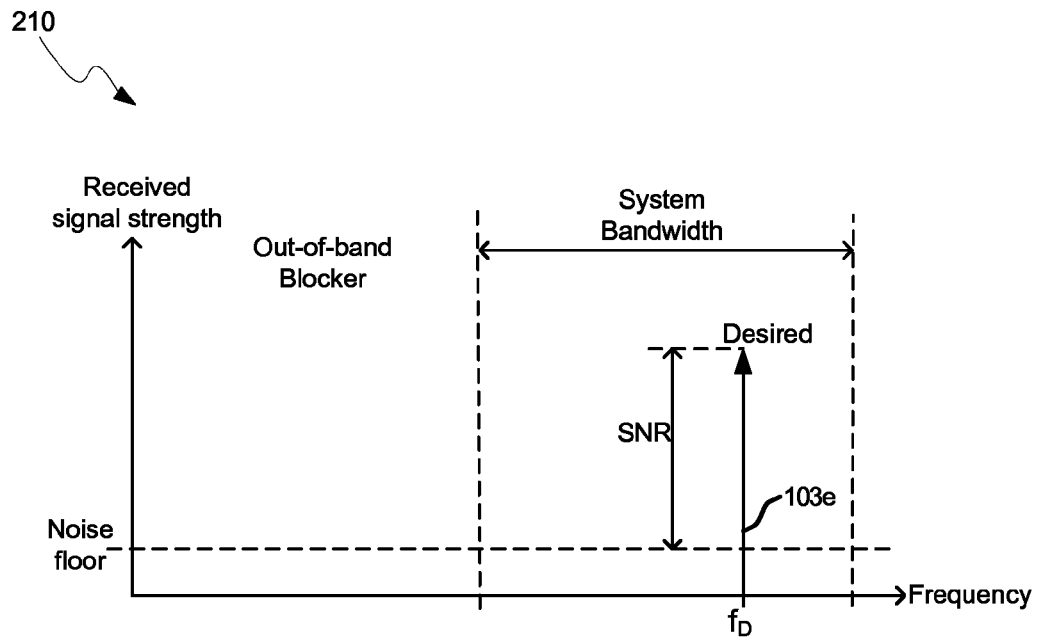
FIGS. 2E-2F are diagrams that illustrates exemplary power management in a beamforming system based on signal to noise ratio in accordance with an embodiment of the invention.
Figure 2F:
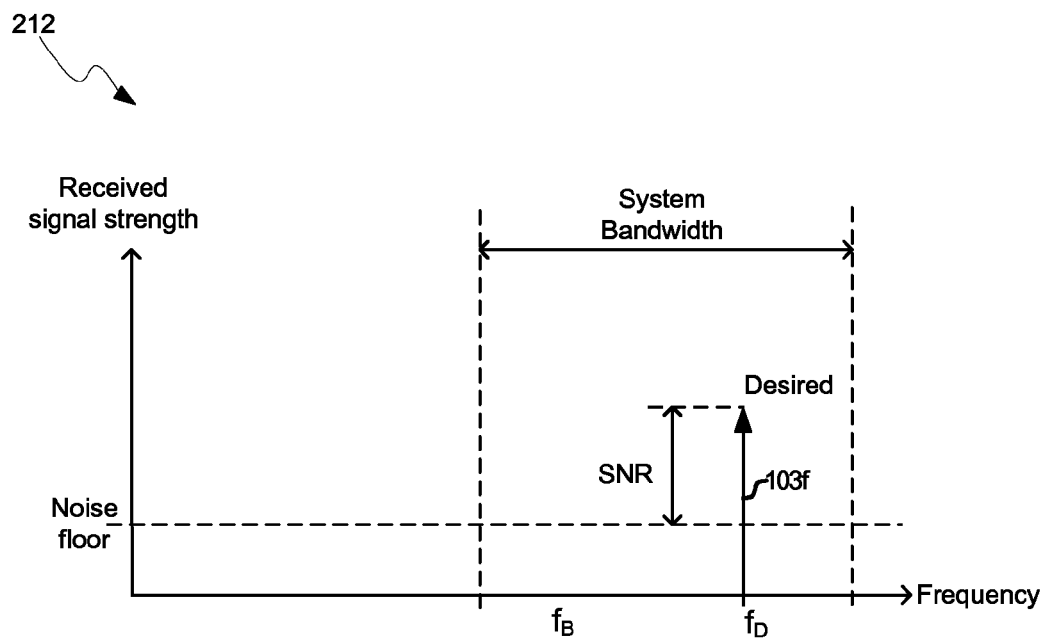

FIGS. 2E-2F are diagrams that illustrates exemplary power management in a beamforming system based on signal to noise ratio in accordance with an embodiment of the invention. Referring to FIGS. 2E and 2F there is shown two exemplary received signals 210 and 212 with desired components 103e and 103f, respectively. In this regard, the system bandwidth depicted in FIGS. 2E and 2F may be determined by one or more filters (not shown) in the wireless device 150 described with respect to FIG. 1. Also depicted in FIGS. 2E and 2F are a noise floor.

In FIG. 2E the desired signal may be sufficiently stronger than the noise floor. In instances where, the desired signal may be sufficiently stronger than the noise floor, such as the signal 103e in FIG. 2E, beamforming may be unnecessary and only a signal transceiver $108_i$ may be enabled.

In FIG. 2F, the desired signal is not sufficiently stronger than the noise floor. In instances where the desired signal is not sufficiently stronger than the noise floor, such as the signal 103f in FIG. 2F, beamforming may be utilized and a plurality of transmitters and/or receivers 108 may be enabled.

Figure 3:
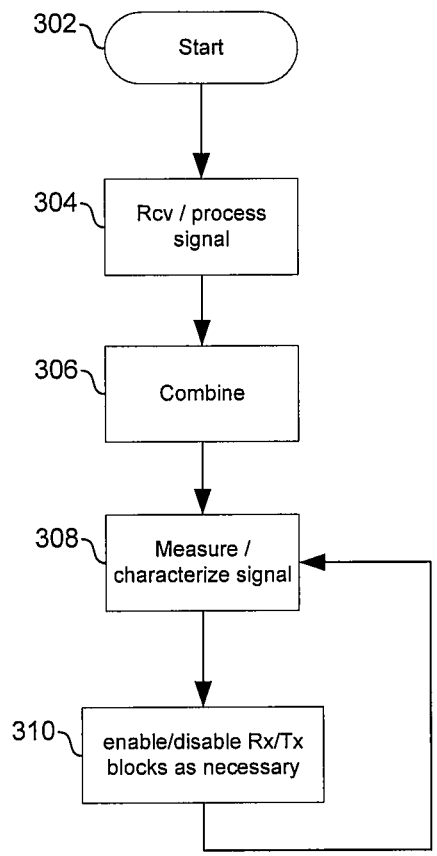
FIG. 3 is a flow chart illustrating exemplary steps for power management in a beamforming system, in accordance with an embodiment of the invention.

FIG. 3 is a flow chart illustrating exemplary steps for power management in a beamforming system, in accordance with an embodiment of the invention. Referring to FIG. 3 the exemplary steps may begin with start step 302 when signals may be received by the antennas 106. Subsequent to step 302, the exemplary steps may advance to step 304. In step 304, received signals $107_1, \ldots, 107_M$ may be processed by the active transmitters and/or receivers $108_1, \ldots, 108_M$. Subsequent to step 304, the exemplary steps may advance to step 306.

In step 306, the signals $109_1, \ldots, 109_M$ output by the transmitters and/or receivers $108_1, \ldots, 108_M$ may be combined into the signal 111. In this regard, the splitter and/or combiner 110 may phase shift and/or scale the signals $109_1, \ldots, 109_M$ based, for example, on coefficients provided via the signal(s) 115. Subsequent to step 306, the exemplary steps may advance to step 308.

In step 308, the baseband processor 129 may provide a measure and/or characterization of the signal 111. Accordingly, the signal(s) 115 generated by the processor 125 may be based, at least in part, on the results of the measurement and/or characterization of the signal 111. Subsequent to step 308, the exemplary steps may advance to the step 310.

In step 310, one or more of the transmitters and/or receivers 108 may be enabled and/or disabled based on the signal(s) 115. Additionally, the splitter and/or combiner 110 may be configured to phase shift and/or scale the signals $109_1, \ldots 109_M$. In this regard, power consumption of the wireless device 110 may be reduced by utilizing beamforming when necessary and powering down portions of the wireless device 150 when possible. Subsequent to step 310, the exemplary steps may return to step 308. In this regard, the process of monitoring signal levels and configuring the transmitters and/or receivers 108 and the splitter and/or combiner 110 may be based on periodic or continuous feedback to improve performance and efficiency of the wireless device 150.

Exemplary aspects of a method and system for on-demand power management in a beamforming system. In this regard, power consumption in a wireless device 150 may be managed by configuring one or more transmitters and/or receivers 108 in the wireless device 150 based on a directivity and/or signal strength of a received signal such as received signals 202, 204, 206, and 208. At least a portion of the transmitters and/or receivers 108 may be disabled and/or enabled based on strength of undesired in-band components 105 of the received signal, undesired out-of-band components 105 of the received signal, signal to noise ratio of a desired component 103 of the received signal, a user selected power mode, and/or a direction from the wireless device 150 to a communication partner 102. A splitter and/or combiner 110 of the wireless device 150 may be configured based on which portion of the transmitters and/or receivers 108 are enabled. A scaling factor and/or a phase shift of the splitter and/or combiner 110 may be configured.

Another embodiment of the invention may provide a machine-readable storage, having stored thereon, a computer program having at least one code section executable by a machine, thereby causing the machine to perform the steps as described herein for on-demand signal notching in a receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising: managing power consumption in a wireless device by configuring one or more of a plurality of transmitters of said wireless device, wherein, at a given time, said wireless device is configured into one of a plurality of modes, said modes comprising:
   a first mode in which only one of said plurality of transmitters of said wireless device is enabled, where said only one of said plurality of transmitters that is enabled is determined based on a directivity of a received signal and a signal strength of said received signal measured utilizing fast fourier transformation (FFT) analysis in said wireless device, said received signal comprising a combination of received signals from each of said plurality of transmitters;
   a second mode in which a variable number of said plurality of transmitters are enabled, and said variable number is automatically varied based on said directivity of said received signal and said signal strength of said received signal measured utilizing said FFT analysis in said wireless device; and
   a third mode in which all of said plurality of transmitters are enabled, regardless of said directivity of said received signal and said signal strength of said received signal, wherein a phase shift is configured using a measurement of said received signal and a table stored in a memory of said wireless device that includes phase shift coefficients for each of said plurality of transmitters, said measurement made utilizing said FFT analysis in said wireless device.

2. The method according to claim 1, wherein said signal strength is a strength of undesired in-band components of said received signal.

3. The method according to claim 1, wherein said signal strength is a strength of undesired out-of-band components of said signal.

4. The method according to claim 1, wherein said wireless device is configured into one of said plurality of modes based on signal to noise ratio of a desired component of said received signal.

5. The method according to claim 1, wherein said wireless device is configured into one of said plurality of modes based on a user-selected power mode.

6. The method according to claim 1, wherein said wireless device is configured into one of said plurality of modes based on a direction from said wireless device to a communication partner.

7. The method according to claim 1, comprising configuring a splitter of said wireless device based on a mode that said plurality of transmitters are configured into.

8. The method according to claim 7, wherein said configuring of said splitter comprises configuring a scaling factor of said splitter.

9. The method according to claim 7, wherein said configuring of said splitter comprises configuring a phase shift of said splitter.

10. A machine-readable storage device having stored thereon, a computer program having at least one code section for signal processing, the at least one code section being executable by a machine for causing the machine to perform steps comprising:
  managing power consumption in a wireless device by configuring one or more of a plurality of transmitters of said wireless device, wherein, at a given time, said wireless device is configured into one of a plurality of modes, said modes comprising:
    a first mode in which only one of said plurality of transmitters of said wireless device is enabled, where said only one of said plurality of transmitters that is enabled is determined based on a directivity of a received signal and a signal strength of a received signal measured utilizing fast fourier transformation (FFT) analysis in said wireless device, said received signal comprising a combination of received signals from each of said plurality of transmitters;
    a second mode in which a variable number of said plurality of transmitters are enabled, and said variable number is automatically varied based on said directivity of said received signal and said signal strength of said received signal measured utilizing said FFT analysis in said wireless device; and
    a third mode in which all of said plurality of transmitters are enabled, regardless of said directivity of said received signal and said signal strength of said received signal, wherein a phase shift is configured using a measurement of said received signal and a table stored in a memory of said wireless device that includes phase shift coefficients for each of said plurality of transmitters, said measurement made utilizing said FFT analysis in said wireless device.

11. The machine-readable storage device according to claim 10, wherein said signal strength is a strength of undesired in-band components of said received signal.

12. The machine-readable storage device according to claim 10, wherein said signal strength is a strength of undesired out-of-band components of said signal.

13. The machine-readable storage device according to claim 10, wherein said wireless device is configured into one of said plurality of modes based on signal to noise ratio of a desired component of said received signal.

14. The machine-readable storage device according to claim 10, wherein said wireless device is configured into one of said plurality of modes based on a user-selected power mode.

15. The machine-readable storage device according to claim 10, wherein said wireless device is configured into one of said plurality of modes based on a direction from said wireless device to a communication partner.

16. The machine-readable storage device according to claim 10, wherein said at least one code section comprises code for configuring a splitter of said wireless device based on a mode that said plurality of transmitters are configured into.

17. The machine-readable storage device according to claim 16, wherein said configuring of said splitter comprises configuring a scaling factor of said splitter.

18. The machine-readable storage device according to claim 16, wherein said configuring of said splitter comprises configuring a phase shift of said splitter.

19. A system for signal processing, the system comprising:
  one or more circuits in a wireless device, wherein said one or more circuits are configured to manage power consumption in said wireless device by configuring one or more of a plurality of transmitters of said wireless device, wherein, at a given time, said wireless device is configured into one of a plurality of modes, said modes comprising:
    a first mode in which only one of said plurality of transmitters of said wireless device is enabled, where said only one of said plurality of transmitters that is enabled is determined based on a directivity of a received signal and a signal strength of said received signal measured utilizing fast fourier transformation (FFT) analysis in said wireless device, said received signal comprising a combination of received signals from each of said plurality of transmitters;
    a second mode in which a variable number of said plurality of transmitters are enabled, and said variable number is automatically varied based on said directivity of said received signal and said signal strength of said received signal measured utilizing said FFT analysis in said wireless device; and
    a third mode in which all of said of transmitters are enabled, regardless of said directivity of said received signal and said signal strength of said received signal, wherein a phase shift is configured using a measurement of said received signal and a table stored in a memory of said wireless device that includes phase shift coefficients for each of said plurality of transmitters, said measurement made utilizing said FFT analysis in said wireless device.

20. The system according to claim 19, wherein said signal strength is a strength of undesired in-band components of said received signal.

21. The system according to claim 19, wherein said signal strength is a strength of undesired out-of-band components of said signal.

22. The system according to claim 19, wherein said wireless device is configured into one of said plurality of modes based on signal to noise ratio of a desired component of said received signal.

23. The system according to claim 19, wherein said wireless device is configured into one of said plurality of modes based on a user-selected power mode.

24. The system according to claim 19, wherein said wireless device is configured into one of said plurality of modes based on a direction from said wireless device to a communication partner.

25. The system according to claim 19, wherein said one or more circuits are operable to configure a splitter of said wireless device based on a mode that said plurality of transmitters are configured into.

26. The system according to claim 25, wherein said configuring of said splitter comprises configuring a scaling factor of said splitter.

27. The system according to claim 25, wherein said configuring of said splitter comprises configuring a phase shift of said splitter.

* * * * *